(12) United States Patent
Takahashi

(10) Patent No.: US 7,009,641 B2
(45) Date of Patent: Mar. 7, 2006

(54) ELECTRONIC CAMERA WITH GAIN ADJUSTMENT

(75) Inventor: Akihiko Takahashi, Kawasaki (JP)

(73) Assignee: Nikon Corporation, Tokyo (JP)

( * ) Notice: Subject to any disclaimer, the term of this patent is extended or adjusted under 35 U.S.C. 154(b) by 610 days.

(21) Appl. No.: 09/906,063

(22) Filed: Jul. 17, 2001

(65) Prior Publication Data

US 2002/0085100 A1    Jul. 4, 2002

(30) Foreign Application Priority Data

Jul. 18, 2000    (JP) .............................. 2000-217351

(51) Int. Cl.
  *H04N 9/73*    (2006.01)
  *H04N 5/232*   (2006.01)
(52) U.S. Cl. .................................. 348/223.1; 348/345
(58) Field of Classification Search ... 348/222.1–228.1
  See application file for complete search history.

(56) References Cited

U.S. PATENT DOCUMENTS

| | | | |
|---|---|---|---|
| 4,823,185 A * | 4/1989 | Miyamoto et al. ....... | 348/227.1 |
| 5,481,302 A * | 1/1996 | Yamamoto et al. ...... | 348/223.1 |
| 5,541,649 A * | 7/1996 | Yamamoto et al. ...... | 348/223.1 |
| 5,691,772 A * | 11/1997 | Suzuki .................... | 348/223.1 |
| 6,181,374 B1 * | 1/2001 | Saito et al. .............. | 348/223.1 |
| 6,727,942 B1 * | 4/2004 | Miyano ................... | 348/223.1 |

* cited by examiner

*Primary Examiner*—David L. Ometz
*Assistant Examiner*—Nhan Tran
(74) *Attorney, Agent, or Firm*—Oliff & Berridge PLC

(57) ABSTRACT

An image-capturing device that captures a subject image through an exchangeable lens, a color sensor that receives the subject image and outputs color data and a white balance detection circuit that determines a white balance adjustment gain by using a correlated color temperature ascertained from the color data read out from the color sensor in correspondence to the focal point detection area used for a focal point detection at a focal point detection device are provided. If the average value of the color data read out from the color sensor does not indicate achromatic color data, the white balance detection circuit reads out the correlated color temperature having been obtained and stored in memory previously from the memory to determine the white balance adjustment R gain and the white balance adjustment B gain.

5 Claims, 13 Drawing Sheets

ELECTRONIC CAMERA WITH GAIN ADJUSTMENT

INCORPORATION BY REFERENCE

The disclosure of following priority application is herein incorporated by reference:

Japanese Patent Application No. 2000-217351 filed Jul. 18, 2000

BACKGROUND OF THE INVENTION

1. Field of the Invention

The present invention relates to an electronic camera that records electronic image data obtained by capturing an image of a subject.

2. Description of the Related Art

There are electronic cameras in the known art which comprise an image-capturing device such as a CCD that captures an image of a subject having passed through a photographic lens and outputs image data and an image processing circuit that implements image processing such as white balance adjustment and γ correction by adjusting the amplification gain for the image data output from the image-capturing device. In the image processing circuit, the image processing is performed by calculating parameters such as the R gain and the B gain for the white balance adjustment or the gradation curve for the γ correction through preset algorithms based upon the image data output from the image-capturing device.

In such an electronic camera in the prior art, a white balance adjustment coefficient is calculated so as to set the average value of the color information corresponding to the main subject, the background and the like, the image of which has been captured, to a value representing an achromatic color such as white or gray and the white balance adjustment is implemented on the image data by using this adjustment coefficient. When a person is photographed in a close-up as in portrait photographing with this camera, it is often impossible to achieve an achromatic color by averaging the color information if the background contains a great deal of highly saturated colors such as flowers or greenery. This poses a concern that an adjustment failure may occur with regard to the white balance adjustment coefficient to change the color tone of the photographed image.

SUMMARY OF THE INVENTION

An object of the present invention is to provide an electronic camera that is capable of reducing to a satisfactory degree the occurrence of white balance adjustment failure by using color information obtained during a previous photographing operation if an achromatic color is not achieved by averaging the color information of image data.

In order to achieve the object described above, the electronic camera according to the present invention comprises an image-capturing device that captures an image of a subject passing through a photographic lens and outputs image data, a color temperature detection circuit that detects color temperature information indicating the color temperature of the subject image, a gain calculation circuit that engages in a specific calculation to obtain a gain by using the color temperature information, a gain adjustment circuit that performs gain adjustment by multiplying the image data output from the image-capturing device by the gain calculated at the gain calculation circuit, a decision-making circuit that makes a decision as to whether not the color temperature information represents a value in a predetermined range, a storage circuit that stores in memory at least either the color temperature information used at the gain calculation circuit or the gain calculated at the gain calculation circuit by using the color temperature information and a control circuit that controls the gain adjustment circuit so as to implement a gain adjustment by using either the gain calculated using the color temperature information stored in the storage circuit or the gain stored in the storage circuit when the decision-making circuit determines that the value indicated by the color temperature information is not within the predetermined range.

The storage circuit may sequentially store at least either the color temperature information or the gain with predetermined timing. The control circuit may implement control on the gain adjustment circuit so that the gain adjustment is performed by using either a gain calculated with the color temperature information having been stored in the storage circuit most recently or a gain having been stored in the storage circuit most recently when the decision-making circuit determines that the value indicated by the color temperature information is not within the predetermined range.

The storage circuit may sequentially store at least either the color temperature information or the gain with predetermined timing. When the decision-making circuit determines that the color temperature information indicates a value that is not within the predetermined range, the control circuit may implement control on the gain adjustment circuit so that a gain adjustment is performed using either (1) a gain calculated with color temperature information obtained by extrapolating from a plurality of sets of color temperature information stored in the storage circuit or (2) a gain obtained by extrapolating from a plurality of gains stored in the storage circuit.

The electronic camera having the storage circuit and the control circuit may further comprise an illumination condition identifying circuit for identifying an illumination condition based upon the color temperature information so that the storage circuit sequentially stores at least either the color information or the gain with predetermined timing. When the decision-making circuit determines that the value indicated by the color temperature information is not within the predetermined range, the control circuit may implement control on the gain adjustment circuit so that the gain adjustment is performed using either (1) a gain calculated with color temperature information obtained by extrapolating from a plurality of sets of color information corresponding to the illumination condition which are stored in the storage circuit or (2) a gain obtained by extrapolating from a plurality of gains corresponding to the illumination condition which are stored in the storage circuit.

An illumination condition identifying circuit is capable of identifying at least, outdoor photographing, indoor photographing, fluorescent lighting, halogen lamp illumination and illumination by an electronic flash unit.

DESCRIPTION OF THE PREFERRED EMBODIMENT

-First Embodiment-

Figure 1:
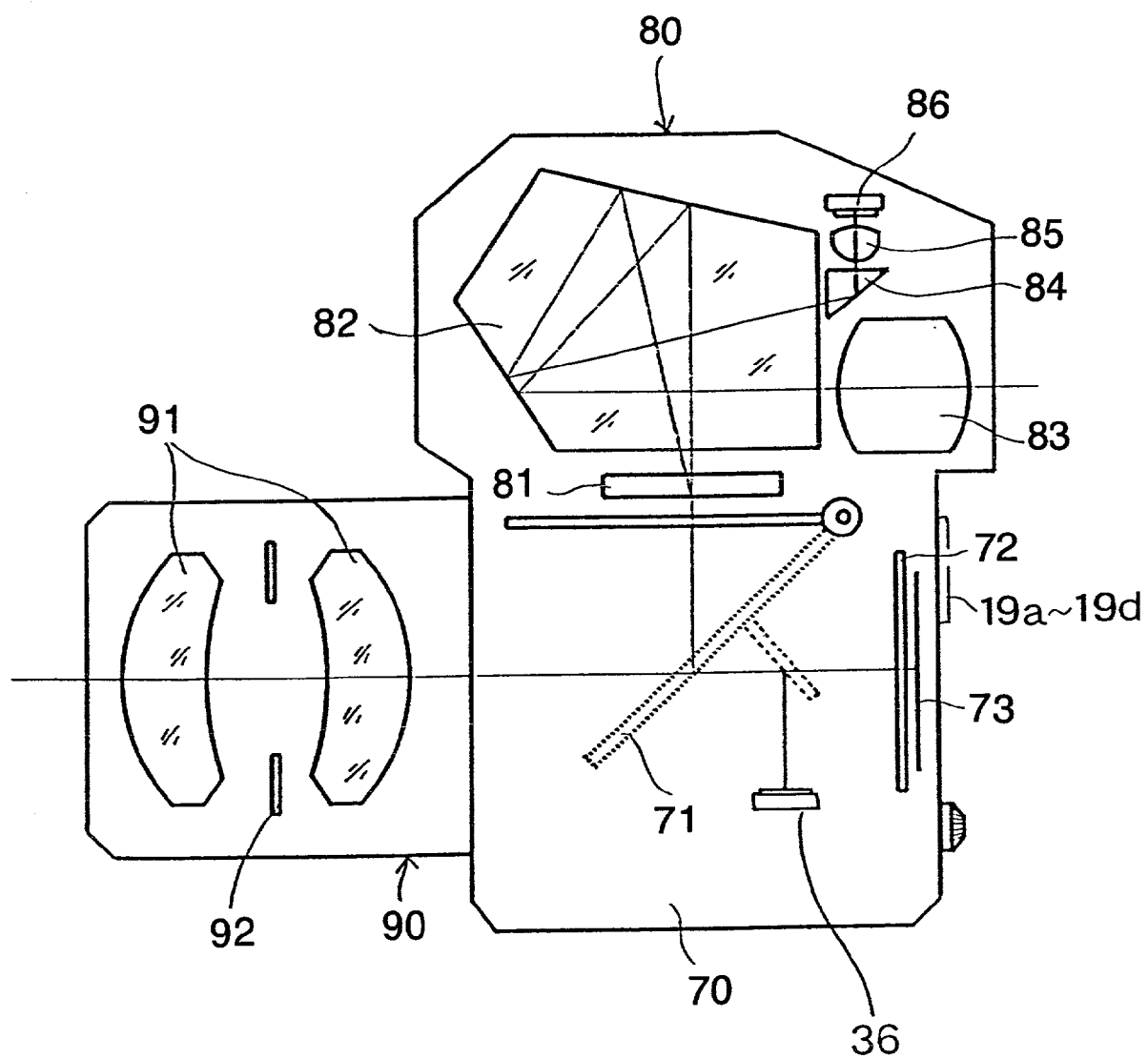
FIG. 1 illustrates the structure inferred in an embodiment of a single lens reflex digital still camera.

The following is an explanation of an embodiment of the present invention given in reference to the drawings. As shown in FIG. 1, the single lens reflex digital still camera in the first embodiment comprises a camera main body 70, a viewfinder device 80 detachably mounted at the camera main body 70 and an exchangeable lens 90 internally provided with lens 91 and an aperture 92 which is detachably mounted at the camera main body 70. Subject light having passed through the exchangeable lens 90 enters the camera main body 70 where it is guided to the viewfinder device 80 by a quick return mirror 71 which is set at the position indicated by the dotted line before a shutter release operation to form an image at a finder mat 81 and it also forms an image at a focal point detection device 36. The subject light having formed an image at the finder mat 81 is then guided to an eyepiece lens 83 by a pentaprism 82. In addition, some subject light enters a color sensor 86 after passing through a prism 84 and an image forming lens 85 and forms a subject image prior to a shutter release operation. After the shutter is released, the quick return mirror 71 rotates to the position indicated by the solid line and the subject light forms an image on an image-capturing device 73 for photographing via a shutter 72. The color sensor 86 is provided at a position which is conjugate with the position of the image-capturing device 73 relative to the photographic lens 91.

Figure 2:
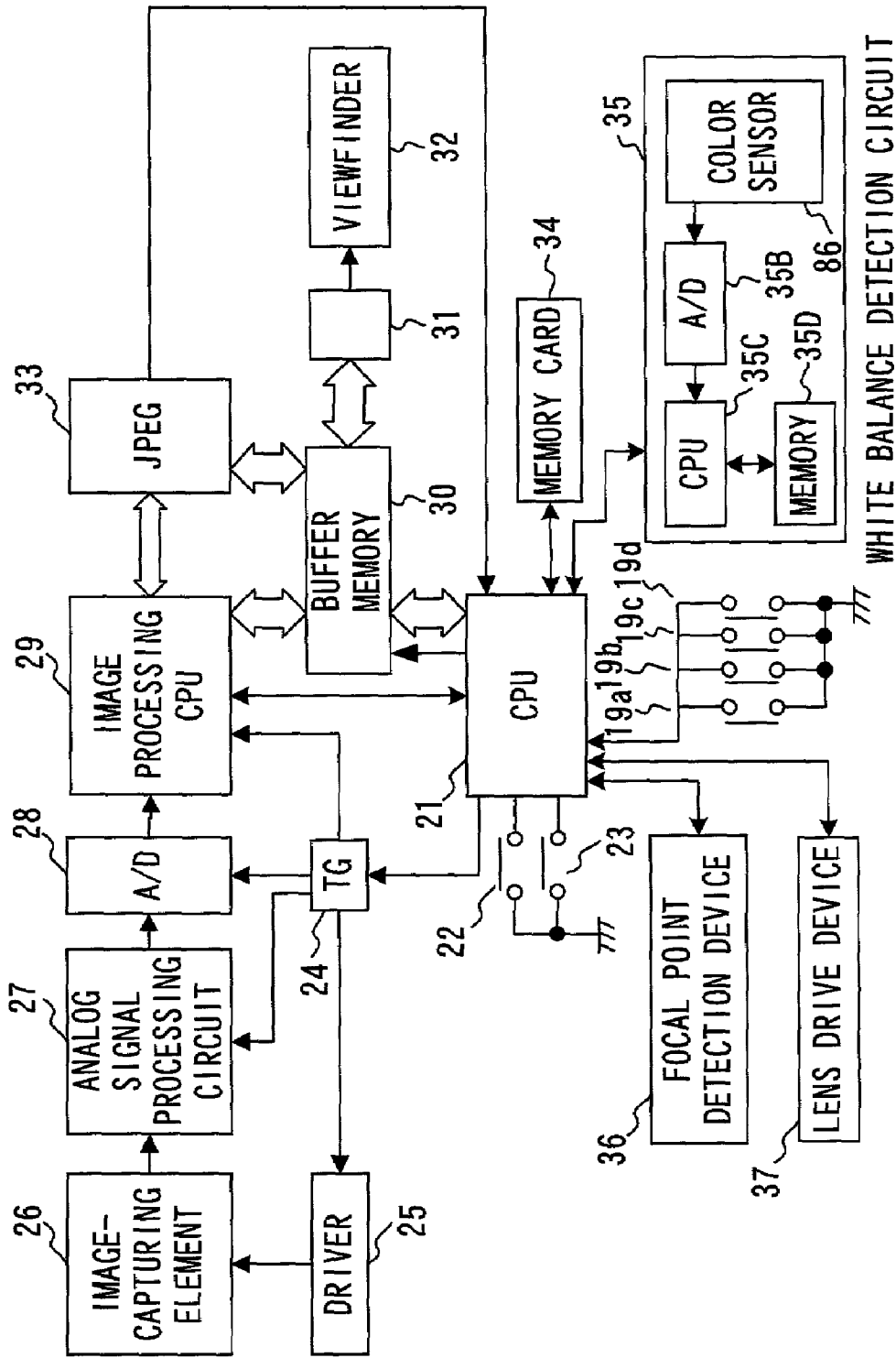
FIG. 2 is a block diagram of the signal processing system in the single lens reflex digital still camera achieved in the embodiment.

FIG. 2 presents a schematic block diagram of the digital still camera. A halfway-press signal and a full-press signal are respectively input from a halfway-press switch 22 and a full-press switch 23 interlocking with a shutter release button to a CPU 21. In addition, input signals from area selector switches 19a~19d operated to select a focal point detection area and a photometering area to be detailed later are input to the CPU 21. In response to a command issued by the CPU 21, the focal point detection device 36 detects the focal adjustment state at the photographic lens 91 and a lens drive device 37 drives the lens 91 to a focus position so as to allow the subject light entering the exchangeable lens 90 to form an image on an image-capturing element 26 of the image-capturing device 73. It is to be noted that the focal point detection device 36 includes a plurality of focal point detection areas and that the focal adjustment state is detected in one focal point detection area selected from them. The CPU 21 implements drive control on the image-capturing element 26 of the image-capturing device 73 via a timing generator 24 and a driver 25. The timing generator 24 controls the operating timing of an analog processing circuit 27 and an A/D conversion circuit 28.

When the full-press switch 23 is turned on following an ON operation at the halfway-press switch 22, the quick return mirror 71 swings upward and, as a result, the subject light from the exchangeable lens 90 forms an image on the light-receiving surface of the image-capturing element 26. The image-capturing element 26, which is constituted of a CCD, stores signal charges corresponding to the brightness level of the subject image. The signal charges having been stored at the image-capturing element 26 are discharged by the driver 25 and are input to the analog signal processing circuit 27 which includes an AGC circuit, a CDS circuit and the like. After an analog image signal undergoes analog processing such as gain control and noise removal at the analog signal processing circuit 27, the analog signal is converted to a digital signal at the A/D conversion circuit 28. The digital signal is then guided to an image processing CPU 29 which may be constituted as, for instance, an ASIC, to undergo image preprocessing to be detailed later such as white balance adjustment, edge compensation and γ correction.

The image data having undergone the image preprocessing further undergo format processing (image post-processing) for JPEG compression, and the image data having undergone the format processing are temporarily stored in a buffer memory 30.

The image data stored in the buffer memory 30 are processed at a display image creation circuit 31 and become image data for display, and the display image data are displayed at a viewfinder 32 such as an LCD as the photographing results. In addition, the image data stored in the buffer memory 30 are compressed at a predetermined compression rate through the JPEG method at a compression circuit 33 and the compressed image data are recorded in a recording medium (memory card) 34 which may be a flash memory.

Figure 3:
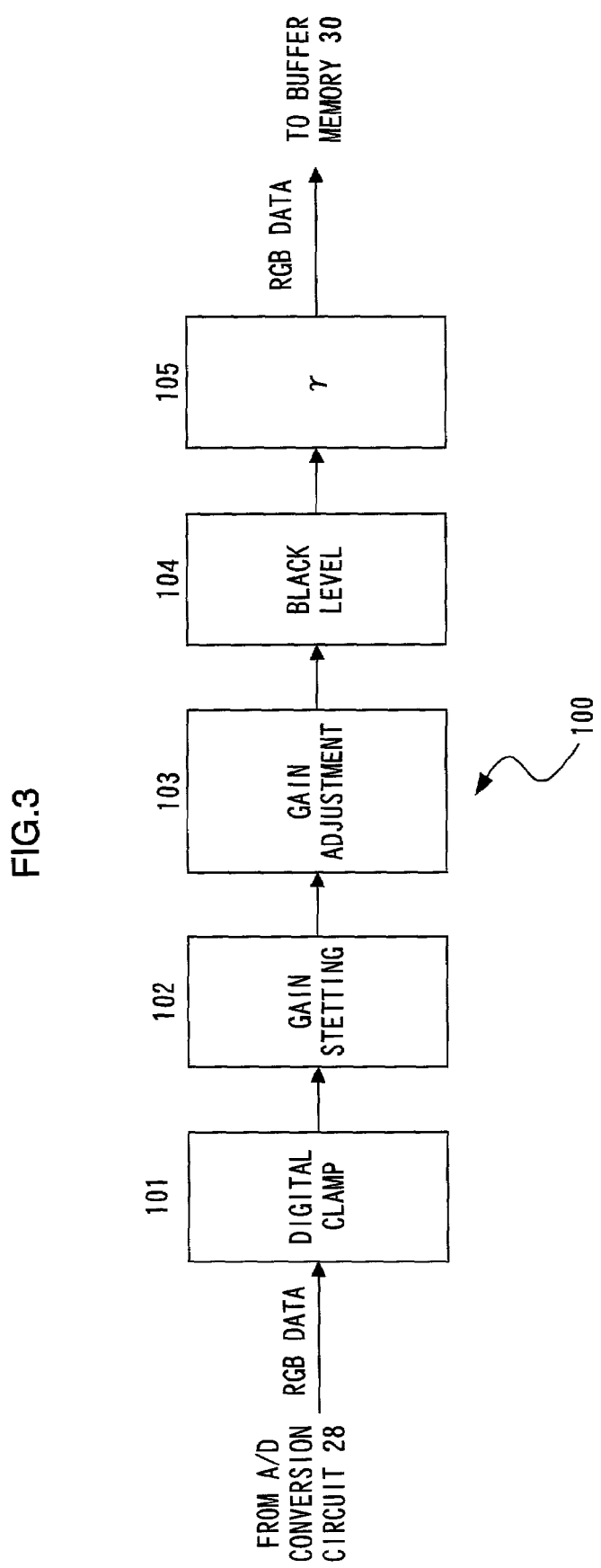
FIG. 3 is a block diagram of the circuit that is engaged in line processing in the signal processing system shown in FIG. 2.

FIG. 3 presents a detailed block diagram of the image processing CPU 29 in the digital camera which operates as described above. The circuit shown in FIG. 3 is a line processing circuit 100 which implements signal processing on image data provided by the image-capturing element 26 in units of individual lines and the line processing circuit 100 engages in the image pre-processing explained earlier. The line processing circuit 100 performs various types of signal processing which are to be detailed later on 12-bit R, G and B signals output from the A/D conversion circuit 28, and comprises a digital clamp circuit 101, a gain setting circuit 102, a gain adjustment circuit 103, a black level circuit 104 and a γ correction circuit 105.

The 12-bit R, G and B signals output from the A/D conversion circuit 28 are input to the digital clamp circuit 101 after data from defective pixels (whose addresses are identified in advance and set at a register) are corrected, in point sequence in units of single lines relative to an output from the image-capturing element 26. The digital clamp circuit 101 subtracts the weighted average of a plurality of sets of pixel data used as optical black from the values indicated by the individual sets of pixel data in each line, in point sequence in units of single lines of the output from the image-capturing element 26.

The gain setting circuit 102 sets adjustment gains for pixel data corresponding to R, G and B colors. The adjustment gains are set so that the gains set for the pixel data corresponding to the individual colors output from the image-capturing element 26 achieve predetermined output levels for the various colors. Even when the output levels of the pixel data output from different image-capturing elements 26 are not consistent, an image data level input to the gain adjustment circuit 103 is corrected to achieve a predetermined level regardless of inconsistency among the individual image-capturing elements 26 by setting the adjustment gains in this manner. The gain adjustment circuit 103 performs a white balance adjustment by multiplying the R-color pixel data and the B-color pixel data that have been input by the R gain and the B gain respectively set for the white balance adjustment. The R gain and the B gain are calculated in advance at a white balance detection circuit 35 and are stored in a memory 35D.

The black level circuit 104 adds values that are predetermined and stored in a register of the CPU 21 to the R, G and B signals, in point sequence in units of single lines of the output from the image-capturing element 26. The γ correction unit 105 implements γ correction using a gradation look-up table in point sequence in units of single lines of the output from the image-capturing element 26.

-White Balance Detection-

Now, the white balance detection processing performed by the white balance detection circuit 35 in FIG. 2 is explained in detail. The white balance detection circuit 35 includes the color sensor 86 mentioned earlier, an A/D conversion circuit 35B that converts an analog signal provided from the color sensor 86 to a digital signal, a CPU 35C that generates a white balance adjustment coefficient in conformance to the digital signal resulting from the conversion and a memory 35D in which a reference look-up table is recorded. The CPU 35C determines a white balance adjustment gain by detecting the white balance in the digital data obtained through an image-capturing operation performed at the color sensor 86 and stores the gain thus determined in the memory 35D. If, on the other hand, no white balance can be detected in the digital data obtained through an image-capturing operation at the color sensor 86, it reads out the adjustment gain determined based upon the white balance ascertained through the preceding detection and stored in the memory 35D.

Figure 4:
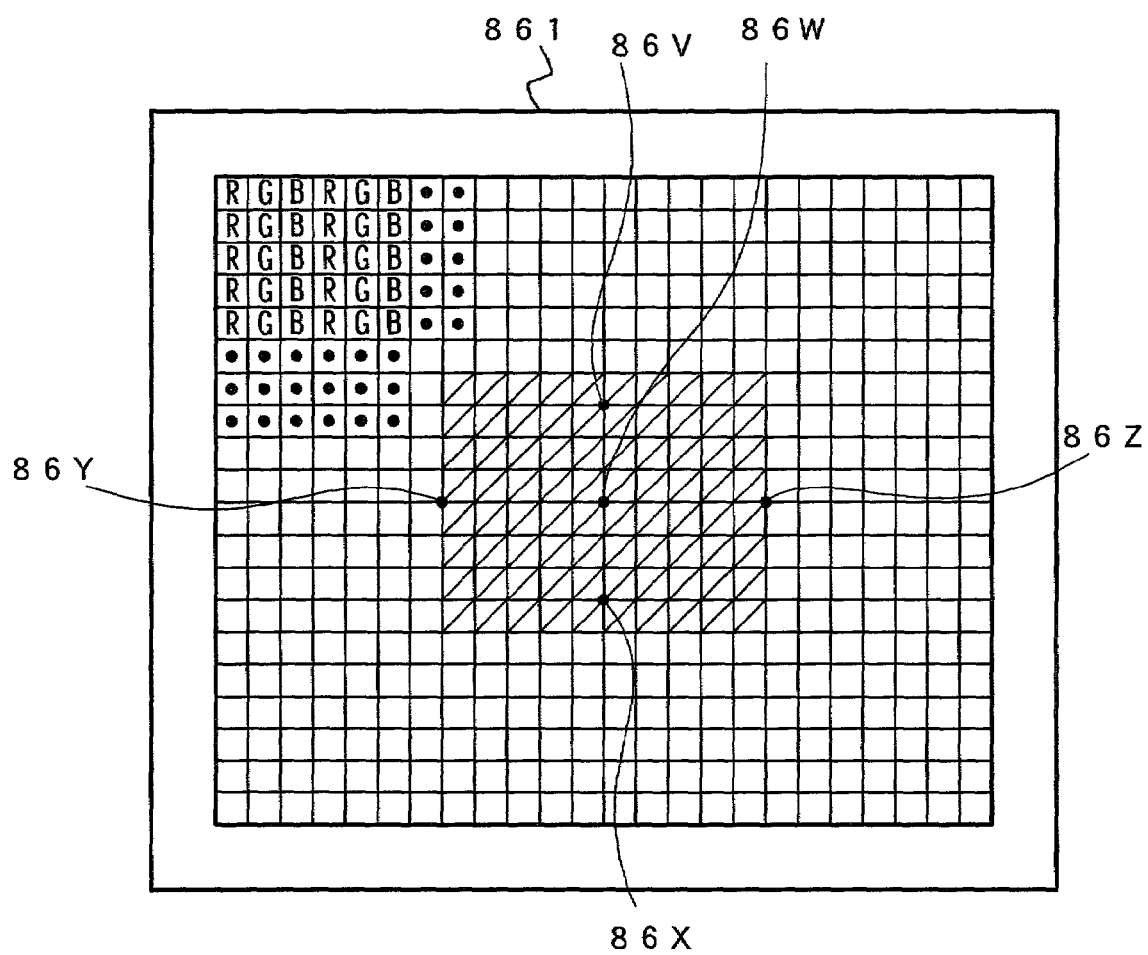
FIG. 4 shows the filter arrangement at the color sensor.

The color sensor 86 may be constituted of a single two dimensional image-capturing element illustrated in FIG. 4, having 480 pixels set over 24 columns (across)×20 rows (down) At the surface of the image-capturing element 86, an RGB color filter 861 divided into 480 blocks over 24 columns (across)×20 rows (down) in correspondence to the 480 pixels is provided. When an image of subject light is captured through this color filter, the subject light is separated into an R-color signal, a G-color signal and a B-color. When the CPU 35C detects color information, color data of the subject light corresponding to the focal point detection area selected at the focal point detection device 36 to be detailed later are read out from the color sensor 86.

In FIG. 4, points 86V~86W indicate positions on the color sensor 86 that correspond to the individual focal point detection areas. For instance, if the focal point detection area at the center of the photographic field is set through the focal point detection area setting operation to be detailed later, the color data corresponding to the R, G and B colors present in a rectangular area ranging over, for instance, 10 pixels (across)×8 pixels (down); (the shaded area in FIG. 4) around the point 86w at the center of the color sensor 86 are read out.

The average values of the data corresponding to the R, G and B colors corresponding to the rectangular area in the color data read out from the color sensor 86 are calculated. Using the average values of the data corresponding to the R, G and B colors thus calculated, the RGB data are converted to data in the TC-Duv coordinate system in conformance to JIS Z8725 "Method of Measuring Light Source Distribution Temperature and Color Temperatures/Correlated Color Temperatures". By plotting the converted data on the TC-Duv coordinate system, data indicating a value within the range of, for instance, ±10 along the Duv axis are determined to be an achromatic color and data indicating a value outside the ±10 range along the Duv axis are determined not to be an achromatic color. If data having undergone the coordinate conversion are determined to be an achromatic color as a result of the decision-making, the correlated color temperature ascertained in the TC-Duv coordinate system is stored in the memory 35D, and also, by fitting the correlated color temperature in the relationships between the correlated color temperature (TC) and the white balance adjustment gains predetermined as shown in FIG. 5, a white balance adjustment R gain for the R data and a white balance adjustment B gain for the B data are determined.

Figure 5:
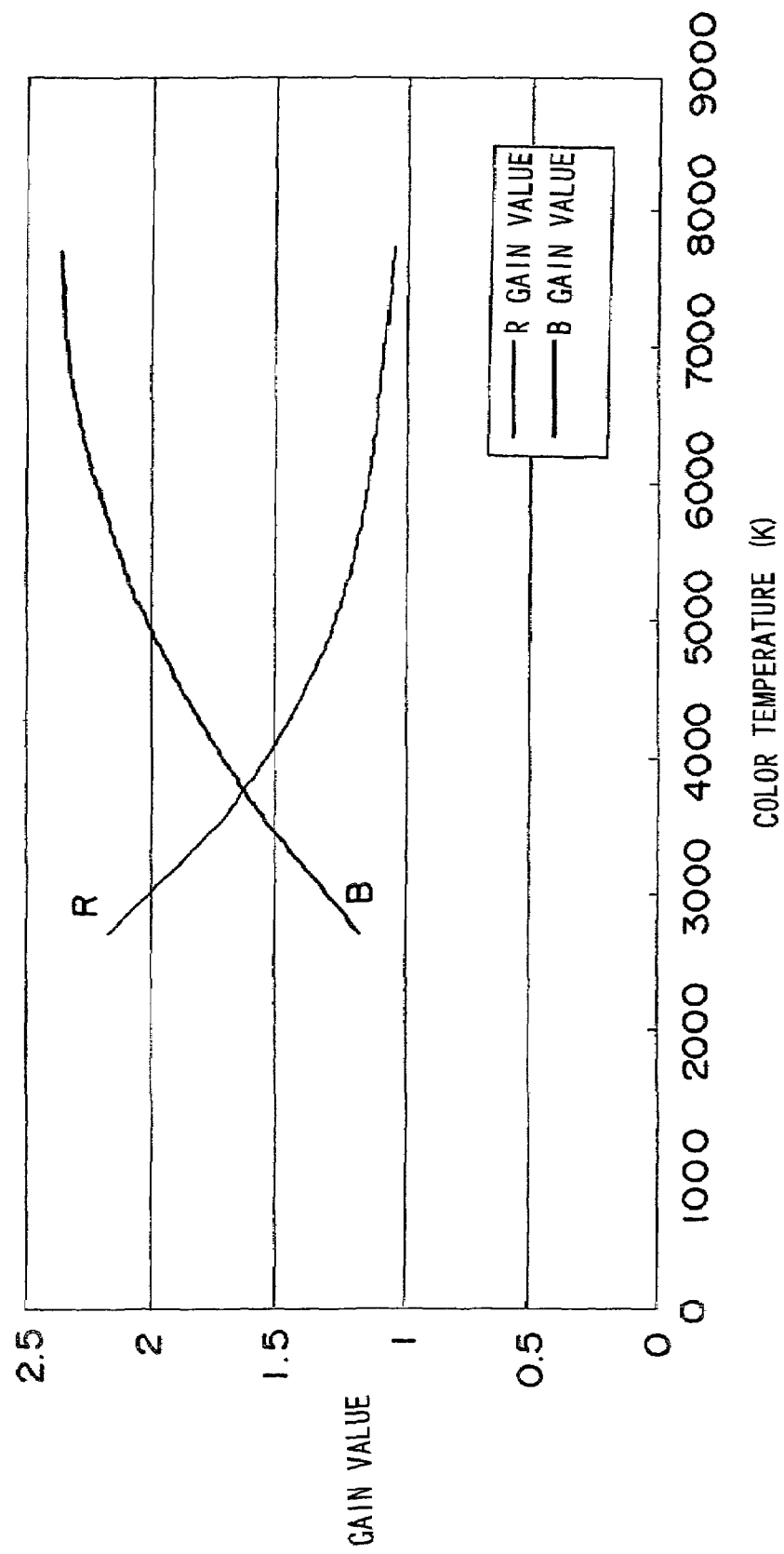
FIG. 5 illustrates the relationship between the color temperature and the white balance adjustment gains.

The values of the R gain and the B gain shown in FIG. 5 are determined through advance measurement so as to set the values of data plotted in the TC-Duv coordinate system along the Duv axis to 0, i.e., so as to adjust the value of data determined to be an achromatic color even closer to the achromatic color and are indicated as functions of the correlated color temperature (TC). The values of the R gain and the B gain are stored in the memory 35D as a look-up table and are read out in correspondence to a given correlated color temperature. The values of the R gain and the B gain thus read out are set as white balance adjustment coefficients to be used for white balance adjustment. These white balance adjustment gains are provided to the image processing CPU 29 via the CPU 21.

Now, an explanation is given on the situation in which data having undergone the coordinate conversion are determined not to be an achromatic color. The relationships shown in FIG. 5 represent the white balance adjustment look-up table provided to adjust the value of data determined to be an achromatic color even closer to the achromatic color. Thus, if the relationships are applied to color data whose averages do not indicate an achromatic color, correct white balance adjustment gain cannot be obtained. For instance, when handling an image of a sunset, the entire image is tinged with red, and in such a case the average of the color data of this scene may not be determined to indicate an achromatic color. If white balance adjustment is implemented on such color data to adjust them closer to the achromatic color, the red tinged sunset scene may be rendered to an achromatic color.

Accordingly, if color data read out from the color sensor 86 are determined not to be an achromatic color, the correlated color temperature ascertained by using color data having been determined to be an achromatic color in the preceding white balance detection, which is stored in the memory 35D is read out from the memory 35D. Then, a white balance adjustment gain is determined based upon the correlated color temperature thus read out. In other words, instead of determining a new erroneous white balance adjustment gain for the color data that is determined not to indicate an achromatic color, the proven white balance adjustment gain already having been used in the previous white balance adjustment is obtained. The white balance adjustment error can be reduced by using the proven white balance adjustment gain compared to the extent of the white balance adjustment error occurring when setting a default correlated color temperature value to be used when color data are determined not to indicate an achromatic color and determining the white balance adjustment gain by using the default value.

The white balance adjustment coefficient determined as described above is used during a white balance adjustment performed at the gain adjustment circuit 103 on image data subsequently obtained through an image-capturing operation at the image-capturing element 26. The white balance adjustment is achieved by multiplying the R signals and the B signals over the entire area of the image captured at the image-capturing element 26 by the R gain and the B gain respectively for the white balance adjustment regardless of the white balance detection area used for the white balance detection.

-Focal Point Detection-

Figure 6:
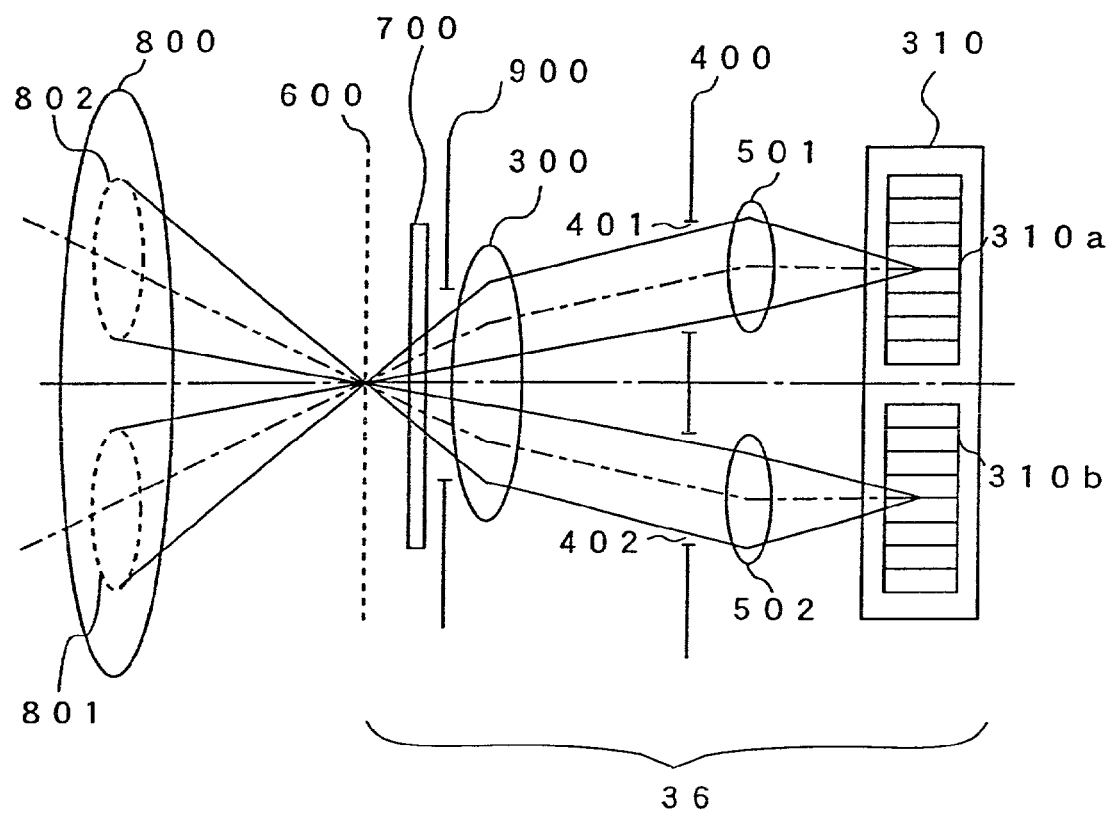
FIG. 6 illustrates the focal point detection device.

In reference to FIG. 6, the structure of the focal point detection device 36 and the principle of the focal point detection operation performed by the focal point detection device 36 are explained. The focal point detection device 36, which is controlled by the CPU 21, comprises an infrared light blocking filter 700, a field mask 900, a field lens 300, an aperture mask 400, image-reforming lenses 501 and 502, an image sensor 310 and the like. An area 800 represents an exit pupil of the photographic lens 91 (see FIG. 1). Areas 801 and 802 are areas at which images achieved by reverse projecting openings 401 and 402 bored at the aperture mask 400 onto the area 800 with the field lens 300 are present. It is to be noted that the infrared light blocking filter 700 may be positioned either on the right side or on the left side of the field mask 900. Light fluxes having entered via the areas 801 and 802 first achieve focus on an equivalent plane 600 of the image-capturing element 26, and forms images on image sensor arrays 310a and 310b after traveling through the infrared light blocking filter 700, the field mask 900, the field lens 300, the openings 401 and 402 and the image-reforming lenses 501 and 502.

The pair of subject images formed on the image sensor arrays 310a and 310b are set closer to each other in a so-called front focus state in which a clearly defined image of the subject is formed by the photographic lens 91 further frontward (toward the subject) relative to the equivalent plane 600 of the image-capturing element 26, and are set further away from each other in a so-called rear focus state in which the photographic lens 91 forms a clearly defined image of the subject further rearward relative to the equivalent plane 600 of the image-capturing element 26. When the subject images formed on the image sensor arrays 310a and 310b achieve a predetermined distance from each other, the clearly defined image of the subject is set on the equivalent plane 600 of the image-capturing element 26. Thus, by converting the pair of subject images to electrical signals through a photoelectric conversion at the image sensor arrays 310a and 310b and ascertaining the relative distance between the pair of subject images through arithmetic processing implemented on these signals, the focal adjustment state at the photographic lens 91, i.e., the direction along which and the extent to which the position of the clearly defined image formed by the exchangeable lens 90 deviates from the equivalent plane 600 of the image-capturing element 26, that represents the offset quantity, is determined. In FIG. 6, the focal point detection area corresponds to the area where the image sensor arrays 310a and 310b, which are reverse-projected by the image-reforming lenses 501 and 502, overlap each other near the equivalent plane 600 of the image-capturing element 26.

Figure 7:
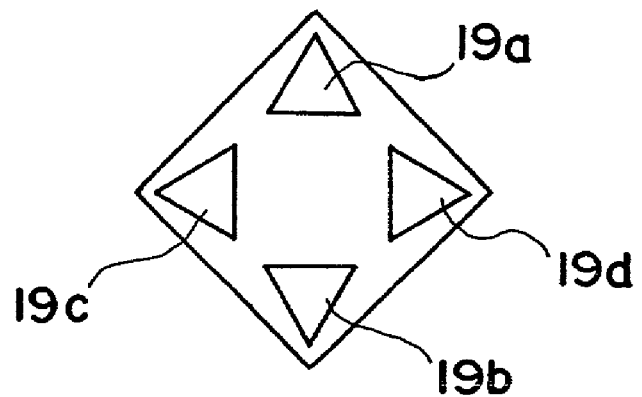
FIG. 7 illustrates the area selector switches.
Figure 8:
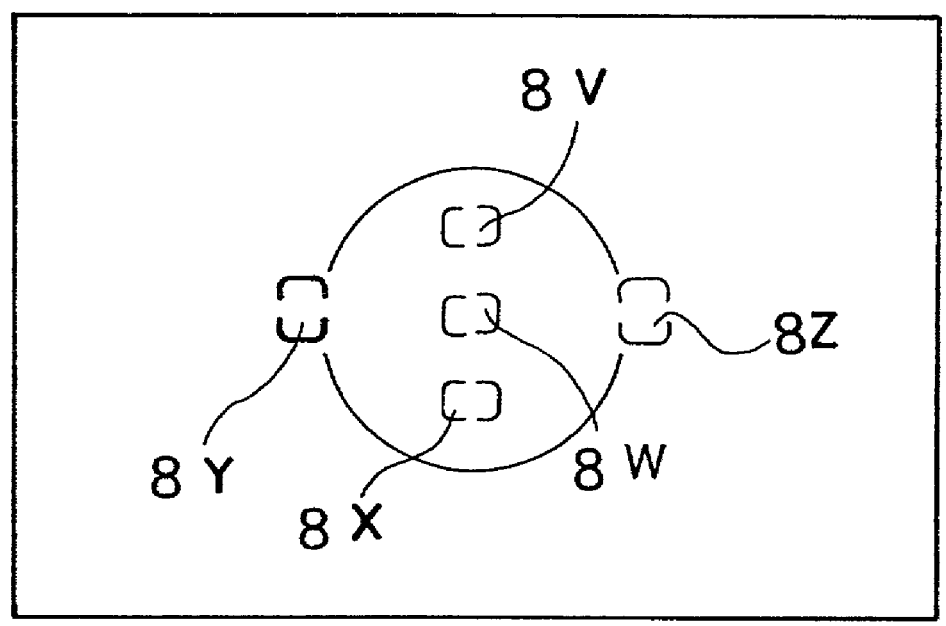
FIG. 8 shows an image plane observed through the eyepiece lens.

The focal point detection area is set as described below within the photographic image plane. FIG. 7 shows the area selector switches 19a~19d provided at the rear side of the digital still camera and FIG. 8 shows the image plane observed through the eyepiece lens 83. FIG. 8 shows five marks 8V~8Z each representing a focal point detection area. The focal point detection area setting is switched by operating one of the area selector switches 19a~19d during a predetermined length of time following an operation of the halfway-press switch 22.

When the halfway-press switch 22 is operated, the area selector switches 19a~19d become valid over the predetermined length of time. If the switch 19a is operated during this period of time, the focal point detection area 8W currently selected in FIG. 8 is switched to the focal point detection area 8V set above the focal point detection area 8W. If the area selector switch 19b is operated next, the focal point detection area 8W is selected again. If the area selector switch 19c is operated, the focal point detection area 8Y to the left of the focal point detection area 8W is selected. Likewise, by operating the area selector switch 19d, the focal point detection area 8Z set to the right of the currently selected focal point detection area 8W is selected. The marker of the focal point detection area thus selected, e.g., the area 8Y in FIG. 8, is highlighted for emphasis over the markers corresponding to other areas. The photographer selects one of the marks 8V~8Z on the main subject to detect the focus position adjustment state explained earlier in the focal point detection area within the photographic image plane corresponding to the selected mark.

It is to be noted that FIG. 6 only shows a single focal point detection area to facilitate the explanation of the principal of the focal point detection. If there are a plurality of focal point detection areas set within the photographic field as shown in FIG. 8, a plurality of openings are provided at the field mask 900 in correspondence to the plurality of focal point detection areas. In such a case, the optical system is designed so as to allow each of the light fluxes having passed through the plurality of openings at the field mask 900 to form a pair of subject images.

The information indicating the focal point detection area used in the focal point detection operation is also used when selecting an area over which the white balance detection is to be implemented as described above. Namely, points 86 V~86 Z on the color sensor 86 respectively correspond to the focal point detection areas 8V~8Z. For instance, if the area 8Y in FIG. 8 is selected as the focal point detection area, the color data corresponding to the R, G and B colors present in the rectangular area over 10 pixels (across)×8 pixels (down) around the point 86Y in FIG. 4 are read out from the color sensor 86 during the white balance detection. The information indicating the focal point detection area is provided from the CPU 21 to the white balance detection circuit 35.

Figure 9:
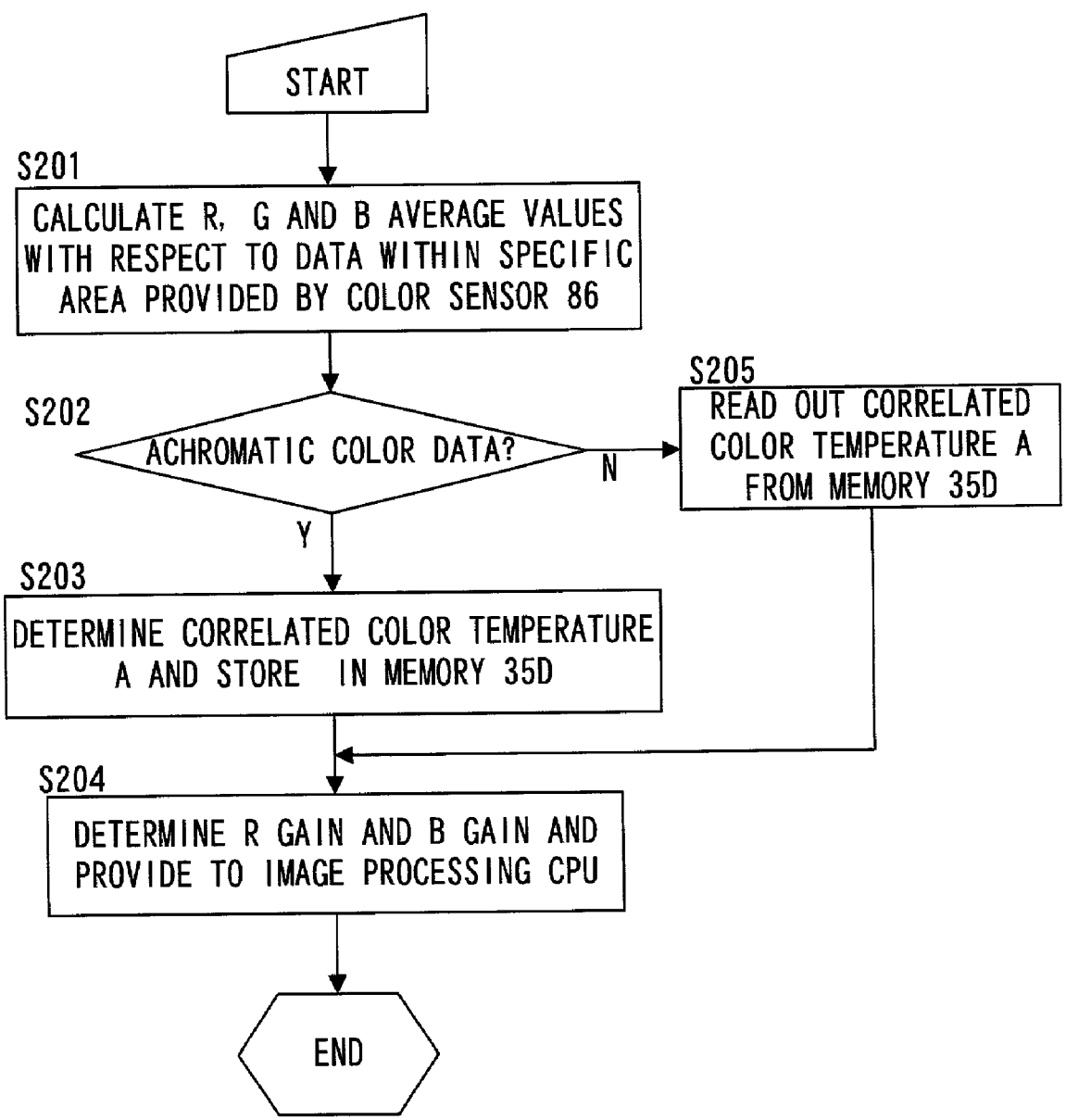
FIG. 9 is a flowchart of the white balance detection processing achieved in the first embodiment.

FIG. 9 is a flowchart of the white balance detection processing implemented in the first embodiment of the present invention. In step S201, signal charges are stored at the color sensor 86 and the signals indicating the stored charges are converted to digital data at the A/D conversion circuit 35B. As the information indicating the position of the focal point detection area over which the focal point detection is performed by the focal point detection device 36 is read out from the memory 35D, the average values of the R-color data, the G-color data and the B-color data are calculated by using the pixel data corresponding to the R, G and B colors within the specific area set around the position on the color sensor 86 corresponding to the focal point detection area.

In step S202, the individual average values of the R, G and B colors are converted to data on the TC-Duv coordinate system and a decision is made as to whether or not the data detected by the color sensor 86 are achromatic color data. If it is decided that the data are achromatic color data (step S202 Y), the operation proceeds to step S203, whereas if they are determined not to be achromatic color data (step S202 N), the operation proceeds to step S205. In step S203, a correlated color temperature A is ascertained by using the data plotted on the TC-Duv coordinate system and the value of the correlated color temperature A thus ascertained is stored in the memory 35D. When the value of the correlated color temperature A is stored in the memory 35D, the value is written over the correlated color temperature A having been stored in memory previously.

In step S204, the white balance adjustment R gain for the R-color data and the white balance adjustment B gain for the B-color data are determined in correspondence to the correlated color temperature A based upon the relationships between the correlated color temperature and white balance adjustment gains presented in FIG. 5. The R gain and the B gain thus determined are provided to the image processing CPU 29, and then the processing in FIG. 9 ends.

If a negative decision is made in step S202 (step S202 N), the operation proceeds to step S205 to read out the correlated color temperature A having been stored in memory 35D. This correlated color temperature A was ascertained when data were determined to be achromatic color data in the preceding operation. In correspondence to the correlated color temperature A ascertained previously, the white balance adjustment R gain and the white balance adjustment B gain are determined in step S204.

Figure 10:
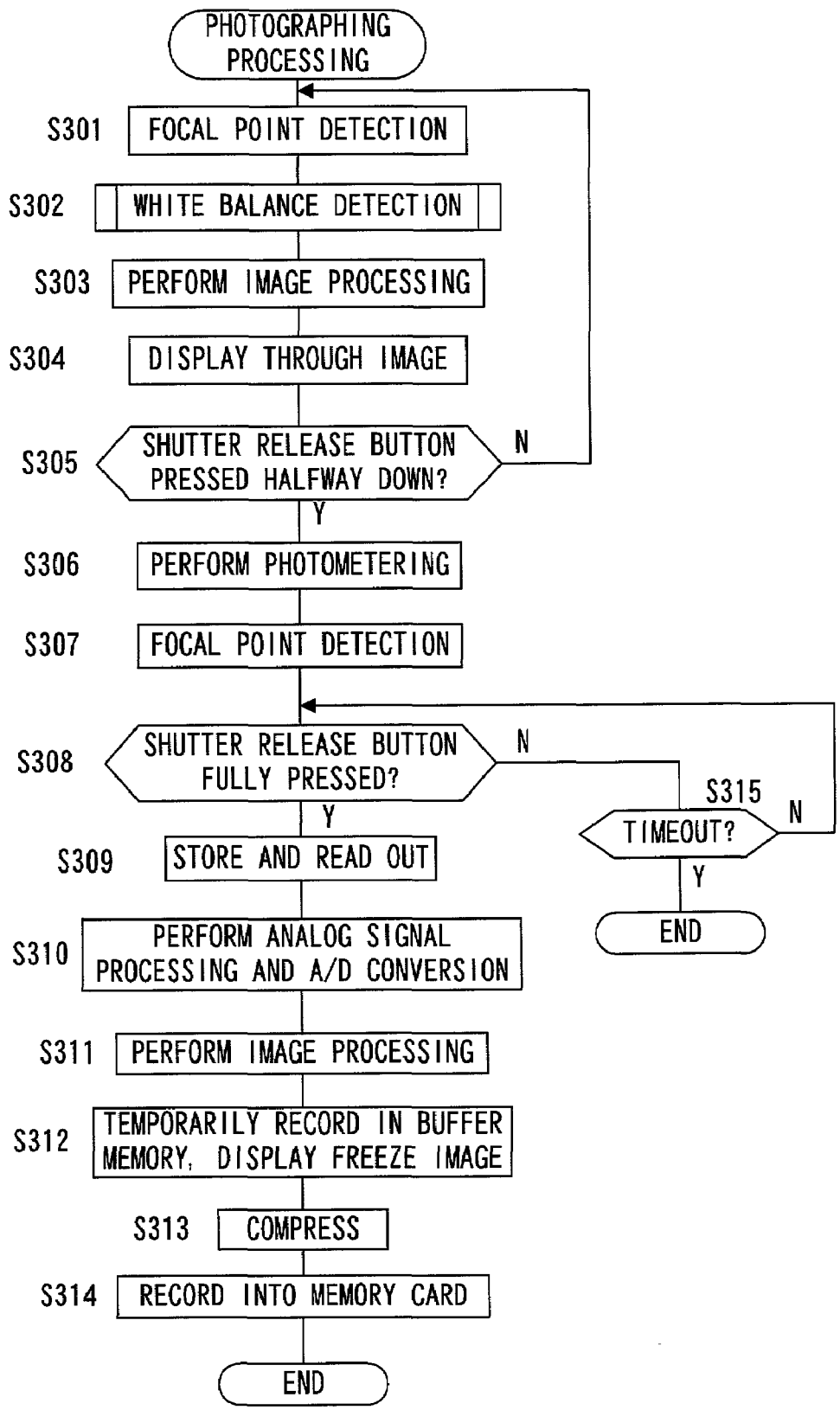
FIG. 10 is a flowchart of the photographing processing.

The operation achieved in the digital still camera structured as described above is now explained. FIG. 10 presents a flowchart of the photographing processing. In step S301, the focal adjustment state is detected by the focal point detection device 36 and the lens drive device 37 drives the lens 91 to the focus position in conformance to the detected focal adjustment state. In step S302, the white balance detection processing explained earlier in reference to FIG. 9 is implemented.

In step S303, signal charges resulting from received light are stored at the individual pixels of the image-capturing element 26 and when the storage operation is completed, the stored charges are sequentially read out from all the pixels. The image data thus read out first undergo the processing at the analog signal processing circuit 27, then they are converted to digital image data at the A/D conversion circuit 28 and the digital image data are input to the image processing CPU 29. At the image processing CPU 29, specific image processing including the white balance adjustment explained earlier is implemented, and instep S304, a through image resulting from the image processing is displayed on the viewfinder 32.

In step S305, a decision is made as to whether or not the halfway-press switch 22 has been operated. If an affirmative decision, i.e., a decision that the halfway-press switch 22 has been performed, is made (step S305 Y), the operation proceeds to step S306, whereas if a negative decision, i.e., a decision that the halfway-press switch 22 has not been operated, is made (step S305 N), the operation returns to step S301. Instep S306, a photometering operation is performed to detect the level of brightness of the subject. The brightness of the subject is detected by the CPU 35C by using the data output from the color sensor 86. After the CPU 35C outputs the data indicating the detected brightness level to the CPU 21, the CPU 21 performs an exposure calculation based upon the brightness data.

In step S307, the focal adjustment state is detected by the focal point detection device 36 and, based upon the detected focal point adjustment state, the lens drive device 37 drives the lens 91 to the focus position. If an affirmative decision, i.e., a decision that the full-press switch 23 has been operated, is made in step S308 (step S308 Y), the quick return mirror swings upward to start the photographing sequence implemented in step S309 and subsequent steps. If, on the other hand, a negative decision, i.e., a decision that the full-press switch 23 has not been operated, is made (step S308 N), the operation proceeds to step S315 to make a timeout decision. If it is decided that a timeout has not occurred in step S315 (step S315 N), the operation returns to step S308, whereas if it is decided that a timeout has occurred (step S315 Y), the processing in FIG. 10 ends without executing the photographing sequence.

In step S309, light reception signals are stored at the individual pixels at the image-capturing element 26 and when the storage operation is completed, the charges having been stored are sequentially read out from all the pixels. Instep S310, the image data that have been read out first undergo the processing at the analog signal processing circuit 27, then the image data are converted to digital image data at the A/D conversion circuit 28 and the converted data are input to the image processing CPU 29. In step S311, the image processing CPU 29 engages in the white balance adjustment, γ gradation correction, JPEG format processing and the like mentioned earlier. Once the image processing is completed, the operation proceeds to step S312 to temporarily store the image data having undergone the image processing in the buffer memory 30 and to display a freeze image at the viewfinder 32. In step S313, the image data are read from the buffer memory 30 and the data thus read out are compressed at the JPEG compression circuit 33. In step S314, the compressed image data are stored in the memory card 34 before the processing in FIG. 10 ends.

While an explanation is given above by assuming that a photographing operation is performed in natural light, it becomes necessary to adjust the white balance adjustment gain if a photographing operation is performed in fluorescent light. Generally speaking, the color temperature of the RGB data obtained by performing a photographing operation in fluorescent light is higher than the color temperature achieved by performing a photographic operation in natural light. This difference in the color temperature may be corrected by correcting the values of the R gain and the B gain in FIG. 5 by a predetermined extent. Accordingly, two look up tables having stored therein the values of the R gain and the B gain should be prepared, one for a photographing operation performed in natural light and the other for a photographing operation performed in fluorescent light, to allow the look-up table corresponding to the type of illuminating light set in advance by the photographer to be read out.

The following advantages are achieved through the first embodiment explained above.

(1) The correlated color temperature obtained in correspondence to color data having been determined to be an achromatic color during the preceding white balance detection is stored in the memory 35D and the correlated color temperature having been thus stored in the memory 35D is read out if the average values of color data output from the color sensor 86 are determined not to be an achromatic color. As a result, even when the average of the color data from the color sensor 86 do not indicate an achromatic color, i.e., even when correct white balance adjustment gains cannot be obtained by implementing the specific processing for calculating white balance adjustment gains, a white balance adjustment can be performed using the proven white balance adjustment gains obtained previously. Consequently, the occurrence of a white balance adjustment failure is prevented and a high-quality image is achieved.

(2) When storing the value of the correlated color temperature in the memory 35D, the new value is written over the correlated color temperature already stored in memory, and thus, the most recent value is stored at all times. Since it may be generally inferred that the most recent correlated color temperature better matches the current photographing conditions than an older correlated color temperature, the rate of white balance adjustment failure can be reduced compared to that when the white balance adjustment is performed using the older value.

(3) Since the color sensor 86 is provided inside the viewfinder device 80, it is possible to receive the white balance detection data at the color sensor 86, determine the white balance adjustment gains and provide the adjustment gains to the image processing CPU 29, before the mirror 71 is raised in response to an operation of the full-press switch 23. As a result, it is not necessary to determine the white balance adjustment gain during the photographing sequence starting in step S309 which is implemented by operating the full-press switch 23, achieving a reduction in the length of time required for the photographing processing compared to the length of time required to implement photographic processing by receiving the white balance detection data during the photographing sequence.

(4) The color sensor 86 is utilized both for white balance detection and for subject brightness detection, which makes it possible to reduce the mounting space compared to the mounting space required when separate devices are provided for the white balance detection and the subject brightness detection and ultimately to reduce the production cost.

While an explanation is given above on an example in which the present invention is adopted in a single lens reflex digital still camera, the present invention may be also adopted in a digital camera which is not a single lens reflex camera. In such a case, separate subject images should be formed at the image-capturing element 26 and the color sensor 86 by utilizing a beam splitter, a half mirror and the like.

In addition, while the image-capturing element 26 and the color sensor 86 are provided as separate devices in the explanation given above, the image-capturing element 26 may function as a color sensor as well. In this case, the data obtained by performing an image-capturing operation at the image-capturing element 26 are used to determine the white balance adjustment gain as described above. Then, a white balance adjustment is implemented using the white balance adjustment gains on the subject image data obtained through an image-capturing operation performed in response to a shutter release operation.

The color data present in the rectangular area ranging over 10 pixels (across)×8 pixels (down) around the point that corresponds to the focal point detection area are read out from the color sensor 86 and the averages are calculated with regard to the color data corresponding to the R, G and B colors thus read out when detecting the color information at the CPU 35C in the explanation given above. However, the area does not need to be rectangular and the size of the area may be different as well. While the magnitude of the arithmetic operation performed to calculate the average values is bound to increase if the color data are read out from a larger area, the area is more likely to contain a plurality of colors in the subject. When a plurality of colors are contained in the area, the possibility of the RGB data obtained by averaging all the color data being determined to be an achromatic color is raised.

While a decision is made in step S202 as to whether or not the RGB data obtained through averaging are achromatic color data, a decision may be made instead as to whether or not the correlated color temperature corresponding to the RGB data obtained through averaging is within a predetermined range. In this case, the decision may be made, for instance, as to whether or not the value of the correlated color temperature A ascertained in correspondence to the data obtained by converting the average values of the R, G and B colors that have been calculated to data on the TC-Duv coordinate system and plotting the conversion data on the TC-Duv coordinate system is within a range of 3000~7000 K. As long as the correlated color temperature is within the 3000~7000 K range, the operation proceeds to step S203, but if the correlated color temperature A is below 3000 K or above 7000 K, the operation proceeds to step S205.

While the value of the correlated color temperature A is stored in the memory 35D in step S203 in the explanation given above, the values of the white balance adjustment R gains and B gains determined in correspondence to the correlated color temperature A in the following step S204 may be stored in the memory 35D instead of the correlated color temperature A.

-Second Embodiment-

In the first embodiment, the correlated color temperature A ascertained during the preceding white balance detection operation is read out from the memory 35D if color data output from the color sensor 86 are determined not to indicate an achromatic color. The second embodiment differs from the first embodiment in that correlated color temperatures A (N) obtained in the past are sequentially stored in the order they were obtained in advance and a color temperature B is inferred through extrapolation by using the stored correlated color temperatures A (N) if color data output from the color sensor 86 are determined not to indicate an achromatic color.

Figure 11:
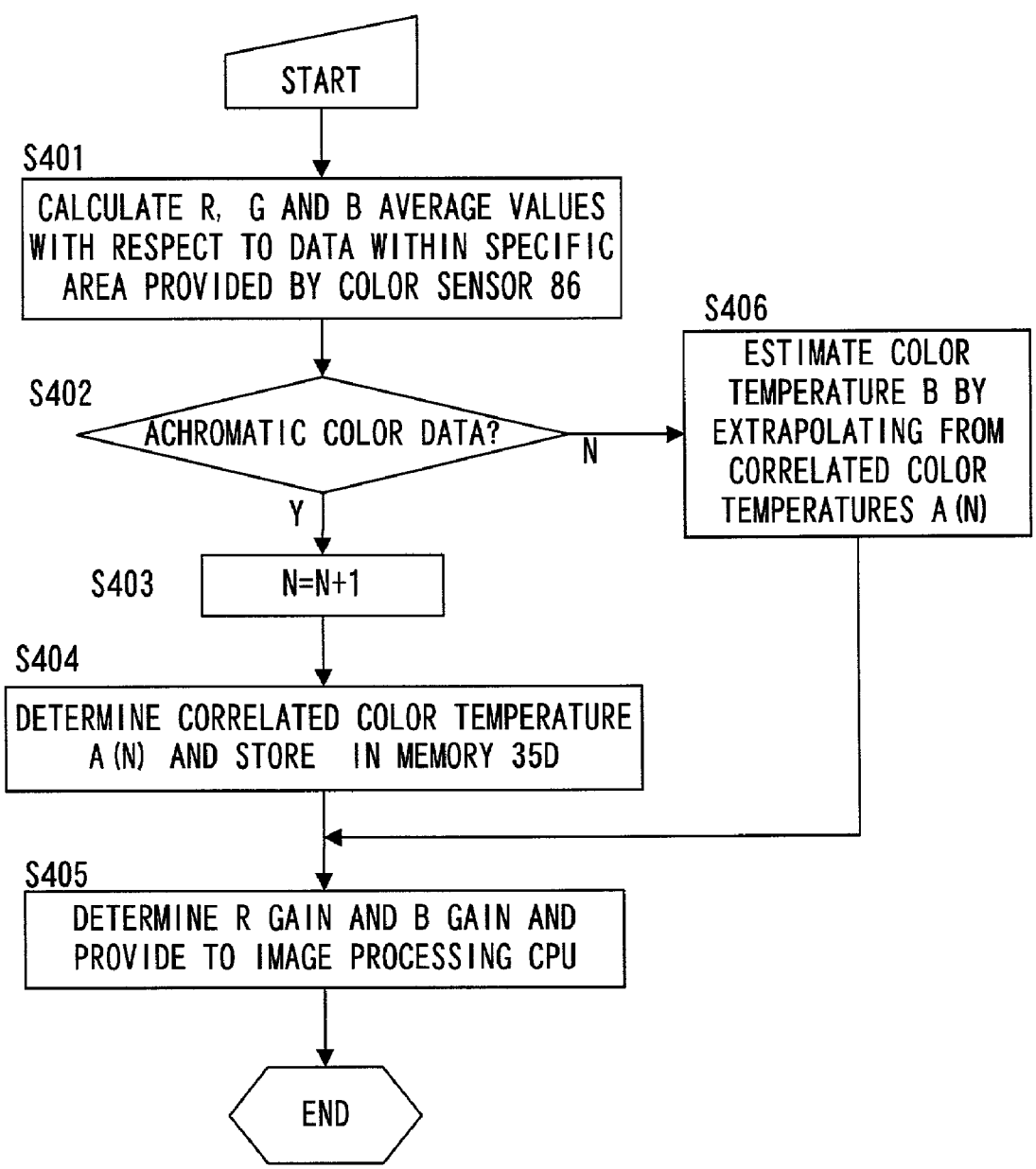
FIG. 11 is a flowchart of the white balance detection processing achieved in a second embodiment.

FIG. 11 is a flowchart of the white balance detection processing implemented in the second embodiment of the present invention. In step S401, signal charges are stored at the color sensor 86 and the signals indicating the stored charges are converted to digital data at the A/D conversion circuit 35B. As the information indicating the position of the focal point detection area over which the focal point detection is performed by the focal point detection device 36 is read out from the memory 35D, the average values of the R-color data, the G-color data and the B-color data are calculated by using the pixel data corresponding to the R, G and B colors within the predetermined area set around the position on the color sensor 86 corresponding to the focal point detection area.

In step S402, the individual average values of the R, G and B colors thus calculated are converted to data on the TC-Duv coordinate system and a decision is made as to whether or not the data detected by the color sensor 86 are achromatic color data. If an affirmative decision is made that the data are achromatic color data (step S402 Y), the operation proceeds to step S403, whereas if a negative decision is made that they are not achromatic color data (step S402 N), the operation proceeds to step S405. In step S403, the value of N indicating the data number is incremented by one.

In step S404, a correlated color temperature A is ascertained using the data plotted on the TC-Duv coordinate system and the value of the correlated color temperature A thus ascertained is stored in the memory 35D as A (N), which indicates the data number assigned to it. The values of the individual correlated color temperatures A (N) are not overwritten and are stored in the memory 35D sequentially in the order of the data numbers N assigned to them.

In step S405, the white balance adjustment R gain for the R-color data and the white balance adjustment B gain for the B-color data are determined in correspondence to the correlated color temperature A (N) based upon the relationships between the correlated color temperature and the white balance adjustment gains presented in FIG. 5. The R gain and the B gain thus determined are provided to the image processing CPU 29, and then the processing in FIG. 11 ends.

Figure 12:
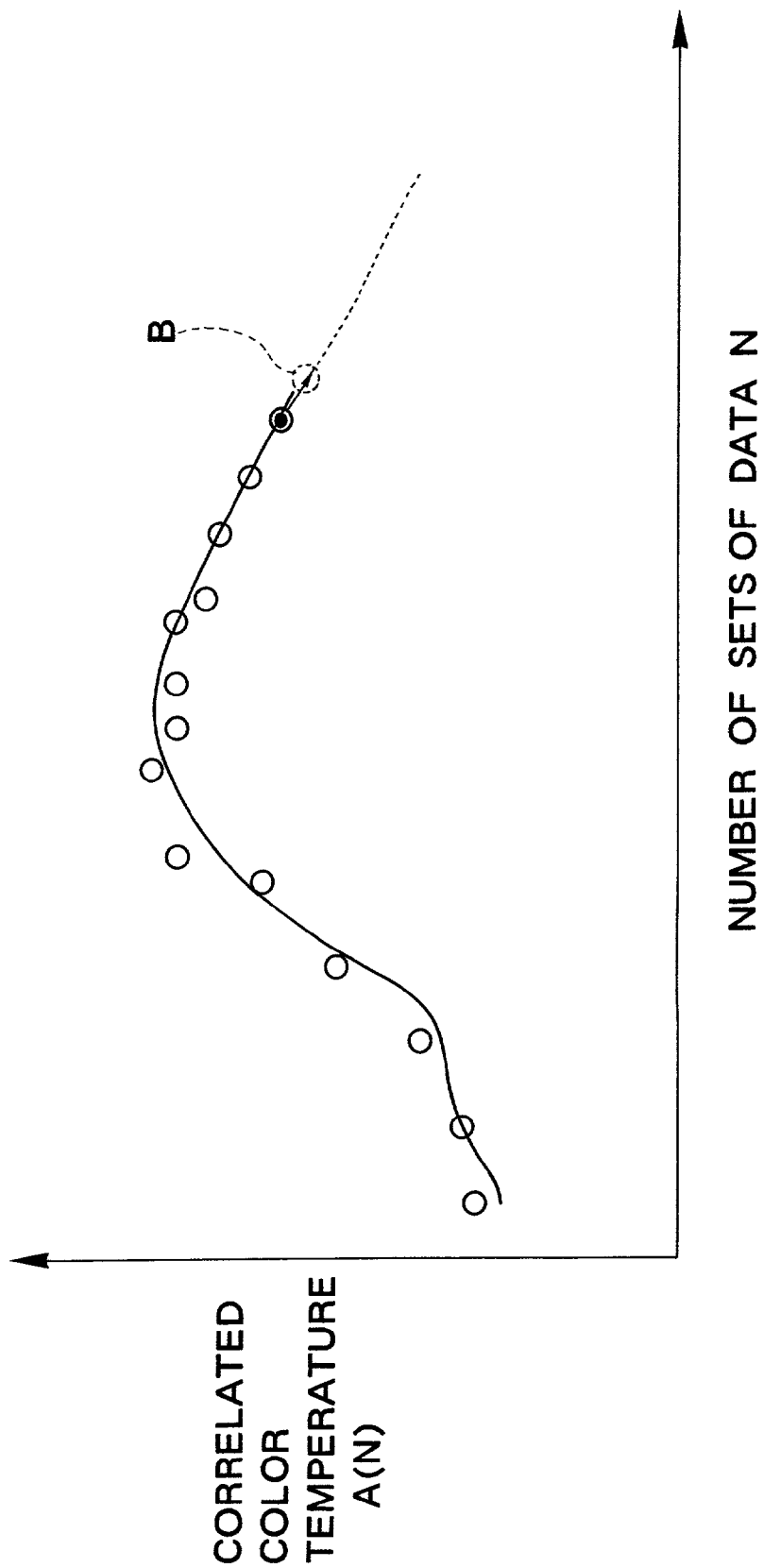
FIG. 12 presents an example of the correlated color temperatures A(N) stored in memory.

In step S406 to which the operation proceeds if a negative decision is made in step S402, the correlated color temperatures A (N) having been stored in the memory 35D are readout. FIG. 12 presents an example of the correlated color temperatures A (N) thus read out. The color temperature B is inferred on the right side (outside) of the data string of correlated color temperatures A (N) through an estimate made by taking into consideration the change in the correlated color temperature A (N). This is referred to as extrapolation since new data are provided to the outside of the existing data string. For instance, if the correlated color temperature A (N) is higher than the correlated color temperature A(N−1), a new color temperature is inferred by taking into consideration the rate of this past increase and the color temperature B higher than the most recent correlated color temperature A (N) is obtained. Using this color temperature B, the white balance adjustment R gain and the white balance adjustment B gain are determined in step S405. Namely, instead of erroneously determining new white balance adjustment gains with regard to color data that are determined not to indicate an achromatic color, the color temperature B is obtained based upon the change occurring in the correlated color temperature A (N) stored in the memory 35D and the white balance adjustment gains are ascertained in conformance with the color temperature B. Each time a new correlated color temperature A (N) is added into the memory 35D, the inferred value of the color temperature B changes accordingly in correspondence to the value of the new correlated color temperature A (N).

The following advantage is achieved in the second embodiment explained above. A decision is made as to whether or not the color data output from the color sensor 86 indicate an achromatic color by averaging the color data and if it is decided that the color data are not achromatic color data, a new color temperature B is inferred through extrapolation based upon the change manifesting among the N correlated color temperatures A (N) stored in the memory 35D. Thus, even when correct white balance adjustment gains cannot be obtained by implementing specific processing for calculating the white balance adjustment gains, it is possible to determine the white balance adjustment gains by using the color temperature B inferred in conformance to the change manifesting among the N correlated color temperatures A (N) having been stored up to the current time point. The occurrence of white balance adjustment error is minimized particularly affectively when the correlated color temperature undergoes a gradual change.

While the correlated color temperatures A are stored in the memory 35D as A (N) in correspondence to the data numbers assigned to them in the order in which they are obtained, the correlated color temperatures A may be stored in the memory 35D as A (N, T) in correspondence to the time points T at which they are obtained in the order in which they are obtained. For instance, when a photographing operation is performed outdoors from morning to evening, the change in the correlated color temperature A (N,T) is stored in the memory 35D in correspondence to the various time points T. If color data from the color sensor 86 are determined not to indicate an achromatic color while performing a photographing operation on another day under similar photographing conditions, the correlated color temperature A (N,T) is read out from the memory 35D in correspondence to the current time point T. Then, the white balance gains are determined using the correlated color temperature A (N,T) that have been read out. Thus, when the correlated color temperature manifests a specific change during the day, an essentially equal correlated color temperature can be read out in correspondence to the correlated color temperature A (N,T) having been stored on a different day as long as the current time point T is ascertained.

In addition, while the value of the correlated color temperature A is stored in the memory 35D in step S404 in the explanation given above, the values of the white balance adjustment R gain and B gain which are determined in correspondence to the correlated color temperature A in the following step S405 may be stored in the memory 35D instead of the correlated color temperature A. In this case, values of the R gain and the B gain are stored in the memory 35D as R (N) and B (N) in correspondence to the data numbers assigned to them sequentially in the order of the data numbers N.

-Third Embodiment-

The values of the white balance adjustment gains relative to the correlated color temperature as presented in FIG. 5 showing the relationship between the correlated color temperature and the white balance adjustment gains used in the first embodiment and the second embodiment need to be adjusted in conformance to the level of the brightness of the subject. In addition, the values of the white balance adjustment gains must be adjusted in correspondence to the type of illuminating light (natural light, fluorescent light or the like) that is used. Accordingly, in the third embodiment, a plurality of look up tables having stored therein values of the white balance adjustment R gain and B gain are prepared in correspondence to varying levels of the subject brightness and different types of illuminating light to obtain a correlated color temperature in correspondence to a specific level of the subject brightness and a specific type of photographing light as well as adopting the features of the second embodiment. The various look up tables are provided in the memory 35D.

Figure 13:
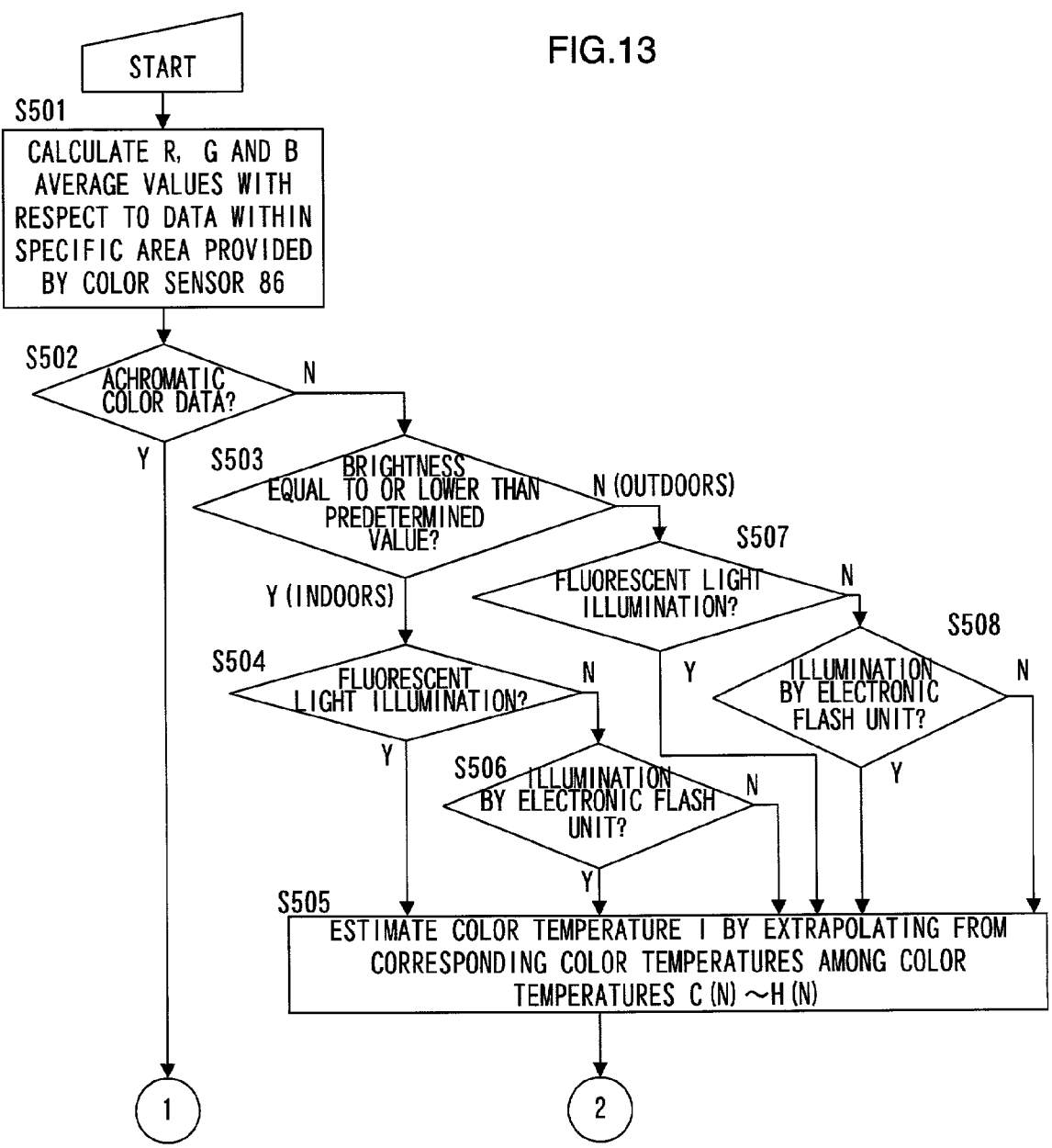
FIG. 13 is the first half of a flowchart of the white balance detection processing achieved in a third embodiment.

FIG. 13 presents the first half of a flowchart of the white balance detection processing achieved in the third embodiment of the present invention. In step S501, signal charges are stored at the color sensor 86 and the signals indicating the stored charges are converted to digital data at the A/D conversion circuit 35B. As the information indicating the position of the focal point detection area over which the focal point detection is performed by the focal point detection device 36 is read out from the memory 35D, the average values of the R-color data, the G-color data and the B-color data are calculated by using the pixel data corresponding to the R, G and B colors within the predetermined area set around the position on the color sensor 86 corresponding to the focal point detection area.

In step S502, the individual average values of the R, G and B colors thus calculated are converted to data on the TC-Duv coordinate system and a decision is made as to whether or not the data detected by the color sensor 86 are achromatic color data. If an affirmative decision is made that the data are achromatic color data (step S502 Y), the operation proceeds to engage in the processing in the second half of the flowchart (FIG. 14), whereas if a negative decision is made that they are determined not an achromatic color data (step S502 N), the operation proceeds to step S503. In step S503, a decision is made as to whether or not the subject brightness is equal to or lower than a predetermined value by using the data output from the color sensor 86. If an affirmative decision, i.e., a decision that the subject brightness indicates a value equal to or lower than the predetermined value is made (step S503 Y), an indoor photographing operation is determined to be under way and the operation proceeds to step S504. In step S504, a decision is made as to whether or not the illuminating light is fluorescent light based upon the position of the data plotted on the TC-Duv coordinate system. For instance, if the value of the data plotted on the TC-Duv coordinate system is on the positive side along the Duv axis and the correlated color temperature is equal to or higher than 5000 K, the illuminating light is determined to fluorescent light (step S504 Y) and the operation proceeds to step S505.

In step S505, the correlated color temperatures stored in correspondence to the individual types of illuminating light are read out from the memory 35D. In the memory 35D, the correlated color temperature values corresponding fluorescent light with the subject brightness equal to or lower than the predetermined value, the correlated color temperature values corresponding to illuminating light emitted from the electronic flash unit provided at the camera and the correlated color temperature values corresponding to illuminating light emitted from a light bulb or the like other than a fluorescent lamp or the electronic flash unit are respectively stored as C (NC), D (ND) and E (NE). By making an estimate using the correlated color temperatures C(NC) corresponding to fluorescent light in step S504 among these correlated color temperatures, a color temperature I to be used for white balance adjustment is ascertained. Once the color temperature I is obtained, the operation proceeds to engage in the processing in the second half of the flowchart (see FIG. 14) in which the white balance adjustment R gain and the white balance adjustment B gain are determined in correspondence to the color temperature I in step S513.

If it is decided in step S504 that the illuminating light is not fluorescent light (step S504 N), a decision is made in step S506 as to whether or not the illuminating light is provided by the electronic flash unit utilized digital still camera. If the value of the data along the Duv axis on the TC-Duv coordinate system and the value of the correlated color temperature are within predetermined ranges, it is decided that the illuminating light is provided by the electronic flash unit (step S506 Y) and the operation proceeds to step S505 to infer the correlated color temperature I using the correlated color temperature D(ND) provided for the electronic flash unit. If, on the other hand, it is decided that the illuminating light is not provided by the electronic flash unit (step S506 N), the correlated color temperature I is inferred using the correlated color temperature E(NE) in step S505.

If a negative decision, i.e., a decision that the subject brightness exceeds the predetermined value, is made in step S503 (step S503 N), it is assumed that the photographing operation is taking place outdoors and the operation proceeds to step S507. In step S507, a decision is made as to whether or not the illuminating light is fluorescent light as in step S504 explained earlier. If it is decided that the illuminating light is fluorescent light (step S507 Y), the operation proceeds to step S505 to infer the correlated color temperature I by using the correlated color temperature F(NF) provided for fluorescent light illumination. If, on the other hand, it is decided that the illuminating light is not fluorescent light (step S507 N), the operation proceeds to step S508 to make a decision as to whether or not the illuminating light is provided by the electronic flash unit utilized in conjunction with the digital still camera. If it is decided that the illuminating light is provided by the electronic flash unit (step S508 Y), the operation proceeds to step S505 to infer the correlated color temperature by using the correlated color temperature G(NG) provided for the electronic flash unit illumination. If it is decided that illuminating light is not provided by the electronic flash unit (step S508 N), the correlated color temperature I is inferred by using the correlated color temperature H(NH) in step S505.

Figure 14:
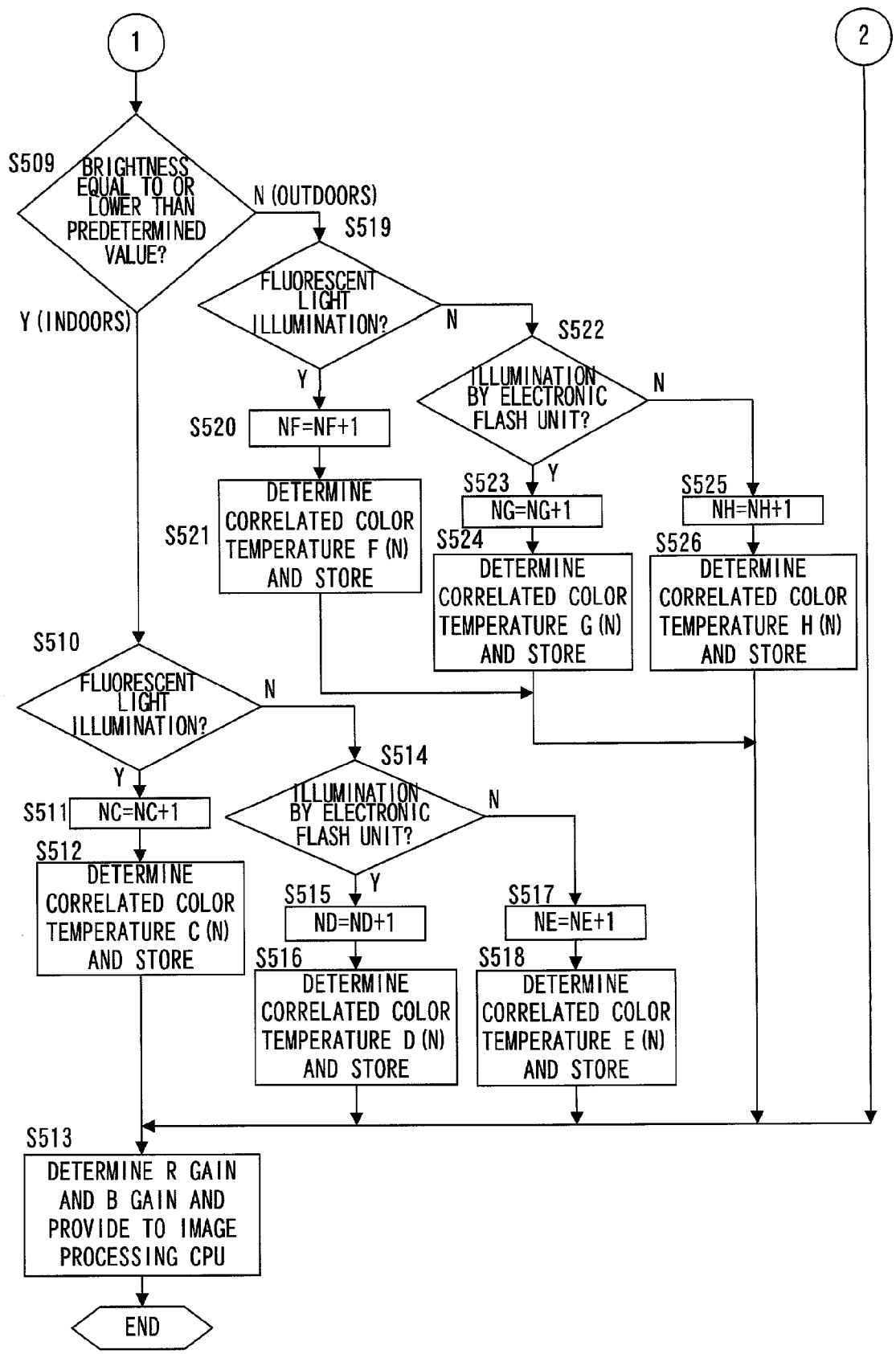
FIG. 14 is the second half of the flowchart of the white balance detection processing achieved in the third embodiment.

FIG. 14 presents the second half of the flowchart of the white balance detection processing achieved in the third embodiment. The operation proceeds to step S509 if it is decided in step S502 in FIG. 13 that the detected data are achromatic color data. In step S509, a decision is made as to whether or not the subject brightness is equal to or under a predetermined value by using the data output from the color sensor 86. If it is decided that the subject brightness indicates a value equal to or lower than the predetermined value (step S509 Y), it is assumed that the photographing operation is taking place indoors and the operation proceeds to step S510. In step S510, a decision is made as to whether or not the illuminating light is fluorescent light. If it is decided that the illuminating light is provided by a fluorescent light lamp (step S510 Y), the operation proceeds to step S511 to increment the value of NC indicating the data number by one.

In step S512, a correlated color temperature C is ascertained by using the data plotted on the TC-Duv coordinate system and the value of the correlated color temperature C thus obtained is stored in the memory 35D as C(NC) in correspondence to the data number NC assigned to the data. The values of the individual correlated color temperatures C(NC) are not overwritten and are stored in the memory 35D sequentially in the order of the data numbers NC assigned to them.

In step S513, the white balance adjustment R gain for the R-color data and the white balance adjustment B gain for the B-color data are determined in correspondence to the correlated color temperature C(NC) provided for the fluorescent light illumination based upon the relationships between the correlated color temperature and white balance adjustment gains presented in FIG. 5. The relationships between the correlated color temperature and the white balance adjustment gains are ascertained and set in correspondence to varying subject brightness levels and various types of illuminating light. The R gain and the B gain thus determined are provided to the image processing CPU 29, and then the processing in FIG. 14 ends.

If it is decided in step S510 that the illuminating light is not fluorescent light (step S510 N), a decision is made in step S514 as to whether or not the illuminating light is provided by the electronic flash unit utilized in conjunction with the digital still camera. If it is decided that the illuminating light is provided by the electronic flash unit (step S514 Y), the operation proceeds to step S515 to increment the value of ND indicating the data number by one. In step S516, a correlated color temperature D is ascertained by using the data plotted on the TC-Duv coordinate system and the value of the correlated color temperature D thus obtained is stored in the memory 35D as D(ND) in correspondence to the data number NC assigned to the data. The values of the individual correlated color temperatures D(ND) are not overwritten and are stored in the memory 35D sequentially in the order of the data numbers ND.

In step S513, the white balance adjustment R gain for the R-color data and the white balance adjustment B gain for the B-color data are determined in correspondence to the correlated color temperature D(ND) provided for electronic flash unit illumination. The R gain and the B gain thus determined are provided to the image processing CPU 29, and then the processing in FIG. 14 ends.

If it is decided in step S514 that the illuminating light is not provided by the electronic flash unit (step S514 N), the operation proceeds to step S517 to increment the value of NE indicating the data number by one. In step S518, a correlated color temperature E is ascertained by using the data plotted on the TC-Duv coordinate system and the value of the correlated color temperature E thus obtained is stored in the memory 35D as E(NE) in correspondence to the data number NE assigned to the data. The values of the individual correlated color temperatures E(NE) are not overwritten and are stored in the memory 35D sequentially in the order of the data numbers NE.

In step S513, the white balance adjustment R gain for the R-color data and the white balance adjustment B gain for the B-color data are determined in correspondence to the correlated color temperature E(NE) provided for illuminating light other than fluorescent light or light emitted by the electronic flash unit. The R gain and the B gain thus determined are provided to the image processing CPU 29, and then the processing in FIG. 14 ends.

If it is decided in step S509 that the subject brightness exceeds the predetermined value (step S509 N), it is assumed that the photographing operation is taking place outdoors and the operation proceeds to step S519. In step S519, a decision is made as to whether or not the illuminating light is fluorescent light. If it is decided that the illuminating light is fluorescent light (step S519 Y), the operation proceeds to step S520 to increment the value of NF indicating the data number by one. In step S521, a correlated color temperature F is ascertained by using the data plotted on the TC-Duv coordinate system and the value of the correlated color temperature F thus obtained is stored in the memory 35D as F(NF) in correspondence to the data number NF assigned to the data. Those values of the individual correlated color temperatures F(NF) are not overwritten and are stored in the memory 35D sequentially in the order of the data numbers NF.

In step S513, the white balance adjustment R gain for the R-color data and the white balance adjustment B gain for the B-color data are determined in correspondence to the correlated color temperature F(NF) provided for fluorescent light illumination. The R gain and the B gain thus determined are provided to the image processing CPU 29, and then the processing in FIG. 14 ends.

If it is decided in step S519 that the illuminating light is not fluorescent light (step S519 N), a decision is made in step S522 as to whether or not the illuminating light is provided by the electronic flash unit utilized in conjunction with the digital still camera. If it is decided that the illuminating light is provided by the electronic flash unit (step S522 Y) the operation proceeds to step S523 to increment the value of NG indicating the data number by one. In step S524, a correlated color temperature G is ascertained by using the data plotted on the TC-Duv coordinate system and the value of the correlated color temperature G thus obtained is stored in the memory 35D as G(NG) in correspondence to the data number NC assigned to the data. The values of the individual correlated color temperatures G(NG) are not overwritten and are stored in the memory 35D sequentially in the order of the data numbers NG.

In step S513, the white balance adjustment R gain for the R-color data and the white balance adjustment B gain for the B-color data are determined in correspondence to the correlated color temperature G(NG) provided for electronic flash unit illumination. The R gain and the B gain thus determined are provided to the image processing CPU 29, and then the processing in FIG. 14 ends.

If it is decided in step S522 that the illuminating light is not provided by the electronic flash unit (step S522 N), the operation proceeds to step S525 to increment the value of NH indicating the data number by one. In step S526, a correlated color temperature H is ascertained by using the data plotted on the TC-Duv coordinate system and the value of the correlated color temperature H thus obtained is stored in the memory 35D as H(NH) in correspondence to the data number NH assigned to the data. The values of the individual correlated color temperatures H(NH) are not overwritten and are stored in the memory 35D sequentially in the order of the data numbers NH.

In step S513, the white balance adjustment R gain for the R-color data and the white balance adjustment B gain for the B-color data are determined in correspondence to the correlated color temperature H(NH) provided for illuminating light other than fluorescent light or light emitted by the electronic flash unit. The R gain and the B gain thus determined are provided to the image processing CPU 29, and then the processing in FIG. 14 ends.

The following advantage is achieved in the third embodiment explained above. A decision is made as to whether the photographing operation is taking place indoors or outdoors by using the color data provided by the color sensor 86 and the type of illuminating light used is identified for the photographing operation under way indoors or outdoors. The correlated color temperatures C(NC)~H(NH) are stored in the memory 35D in correspondence to the individual illumination conditions identified through the decision making process. A decision is then made as to whether or not the average of the color data output from the color sensor 86 indicate an achromatic color, and if it is decided that the average do not indicate an achromatic color, the next color temperature I is inferred through extrapolation based upon the change manifested by the correlated color temperatures among the correlated color temperatures C(NC)~H(NH) stored in the memory 35D that correspond to the identified illumination condition. Thus, even when correct white balance adjustment gains cannot be obtained by implementing the specific processing for calculating the white balance adjustment gains, a color temperature can be inferred in correspondence to the illumination condition to make it possible to determine white balance adjustment gains matching the specific type of illuminating light among the various types of illuminating light.

While the types of illuminating light are classified as fluorescent light, illuminating light emitted by the electronic flash unit and another type of light in the explanation given above, they may include illuminating light provided by a halogen lamp, illuminating light provided by an incandescent lamp and sunlight in addition to the types of illuminating light listed above. This classification is achieved by using the values of data plotted on the TC-Duv coordinate system along the Duv axis and the value of the correlated color temperature.

In addition, while the values of the correlated color temperatures corresponding to the various illumination conditions are stored in the memory 35D in the explanation given above, the white balance adjustment R gain and B gain values determined in correspondence to the various correlated color temperatures may be stored in the memory 35D instead of the correlated color temperatures. In this case, the R gain and B gain values are made to correspond to the data numbers NC~NH assigned to data obtained under the various illumination conditions and are stored in the memory 35D in the order of the data numbers NC~NH.

What is claimed is:

1. An electronic camera comprising:
   an image-capturing device that captures an image of a subject passing through a photographic lens and outputs image data;
   a color temperature detection circuit that detects color temperature information indicating a color temperature of the subject image;
   a gain calculation circuit that engages in a specific calculation to obtain a gain by using the color temperature information;
   a gain adjustment circuit that performs gain adjustment by multiplying the image data output from said image-capturing device by the gain calculated at said gain calculation circuit;
   a decision-making circuit that makes a decision as to whether or not the color temperature information indicates a value within a predetermined range;
   a storage circuit that stores at least either the color temperature information used at said gain calculation circuit or the gain calculated at said gain calculation circuit by using the color temperature information; and
   a control circuit that controls said gain adjustment circuit so as to implement a gain adjustment by using either a gain calculated with the color temperature information stored in said storage circuit or the gain stored in said storage circuit when said decision-making device determines that the value indicated by the color temperature information is not within the predetermined range, wherein:
   said storage circuit sequentially stores at least either the color temperature information or the gain with predetermined timing; and
   when said decision-making circuit determines that the value indicated by the color temperature information is not within the predetermined range, said control circuit implements control on said gain adjustment circuit so that a gain adjustment is performed using either (1) a gain calculated with color temperature information inferred through extrapolating from a plurality of sets of color temperature information stored in said storage circuit or (2) a gain inferred through extrapolating from a plurality of gains stored in said storage circuit.

2. An electronic camera according to claim 1, further comprising:
   an illumination condition identifying circuit that is capable of identifying an illumination condition based upon color temperature information, wherein:
   said storage circuit sequentially stores at least either the color temperature information or the gain with predetermined timing in correspondence to the illumination condition identified by said illumination condition identifying circuit; and
   when said decision-making circuit determines that the value indicated by the color temperature information is not within the predetermined range, said control circuit implements control on said gain adjustment circuit so that a gain adjustment is performed using either (1) a gain calculated with color temperature information inferred through extrapolating from a plurality of sets of color temperature information stored in correspondence to the illumination condition in said storage circuit or (2) a gain inferred through extrapolating from a plurality of gains stored in correspondence to the illumination condition in said storage circuit.

3. An electronic camera according to claim 2, wherein:
   said illumination condition identifying circuit is capable of identifying at least outdoor photographing, indoor photographing, fluorescent lighting, halogen lamp illumination and illumination by an electronic flash unit.

4. An electronic camera according to claim 1, wherein:
   said color temperature detection circuit comprises a two-dimensional sensor that is different from said image-capturing device.

5. An electronic camera according to claim 1, further comprising:
   a focal point detection area selection device that selects at least one of a plurality of focal point detection areas, wherein:
   said storage circuit stores at least either the color temperature information used at said gain calculation circuit or the gain calculated at said gain calculation circuit by using the color temperature information, in correspondence to one or more focal point detection areas selected by said focal point detection area selection device.

* * * * *